Figures 1, 2, 3:
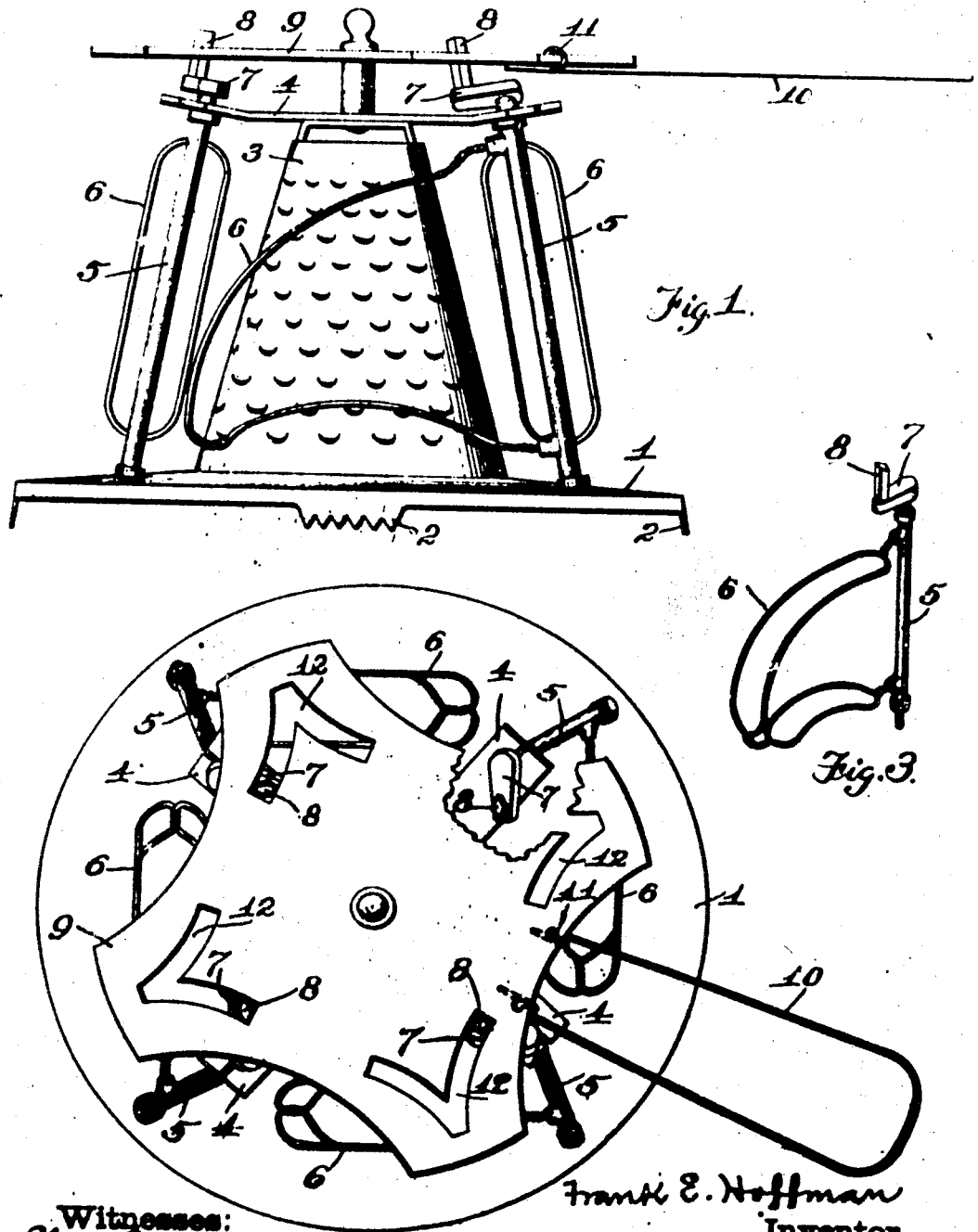

F. E. HOFFMAN.
TOASTER.
APPLICATION FILED DEC. 3, 1909.

976,364.

Patented Nov. 22, 1910.

Witnesses:
Elmer R. Shipley
M. S. Belden

Frank E. Hoffman
Inventor
by James W. See
Attorney

UNITED STATES PATENT OFFICE.

FRANK E. HOFFMAN, OF HAMILTON, OHIO.

TOASTER.

976,364.

Specification of Letters Patent.  Patented Nov. 22, 1910.

Application filed December 3, 1908. Serial No. 465,811.

*To all whom it may concern:*

Be it known that I, FRANK E. HOFFMAN, a citizen of the United States, residing at Hamilton, Butler county, Ohio, have invented certain new and useful Improvements in Toasters, of which the following is a specification.

This invention relates to a toaster, designed particularly for gas stove use and intended to support one or more slices of bread in angularly movable holders in such manner that when one side of the bread has been toasted a single movement of the handle reverses the bread so as to present the other side for toasting action.

The invention will be readily understood from the following description taken in connection with the accompanying drawing in which:—

Figure 1 is a side elevation of a toaster forming one exemplification of the invention; Fig. 2 a plan of the same, with a portion of the cam-plate broken away to expose parts below it; and Fig. 3 a perspective view on a reduced scale of one of the angularly movable bread-holders.

In the drawings:—1, indicates a base-ring adapted to set over the flame whose heat is to do the toasting; 2, clawed feet upon the base to enable the base to take a better hold upon the surface on which the toaster stands, the top of a gas stove, for instance; 3, a hollow toaster-body projecting upwardly from the base and adapted to have the heating flame and gases pass through it, the heat radiating from this hollow body doing the toasting, in a not unusual manner, and the wall of this body being perforated, as usual, the body being illustrated as being the frustum of a cone with upwardly converging sides; 4, arms projecting rigidly outward from the top of the cone, the illustration showing four arms, appropriate to the toasting of four slices at once; 5, shafts disposed substantially parallel with the wall of the toaster-body and having their lower ends journaled in the base and having their upper portions journaled in the arms 4; 6, a skeleton wire slice-holder projecting rigidly outward from each shaft and adapted to support a slice of bread with one of its sides substantially parallel with the wall of the toaster-body; 7, a crank on the upper end of each shaft; 8, a crank-pin projecting upwardly from each crank; 9, a horizontal cam-plate mounted for free rotation on the top of the toaster-body; 10, a handle projecting outwardly from one edge of the cam-plate to serve in rotating it; 11, a hinge uniting the handle of the cam-plate in such manner that when the device is not in use the handle may be folded over on top of the cam-plate for compactness; and 12, cam-grooves, one for each crank and engaged by the crank-pins, the grooves being of such form that when the crank-pins are in one extremity of the grooves the slice holders will present one side near the toaster-body, and when the cam-plate is given a partial rotation it will bring the crank-pins to the other extremity of the grooves and, in doing so, will give the cranks and shafts a quarter turn and present the opposite sides of the slice-holders near the toaster-body.

In using the device when it is hot, the cam-plate is to be so turned as to project the slice-holders outwardly so as to permit the insertion of the bread-slices with comfort, after which the cam-plate is to be turned to present one side of the slices to the toaster-body. When one side has been toasted then the proper movement of the handle reverses the slices, and when the second side is toasted, then the slice-holders may be swung outwardly and the slices removed. The slices could, of course, be inserted in the slice-holders while the latter occupy a toasting position, but the performance of the act while the slice-holders project outwardly is attended with greater comfort, that position being farthest from the hot toaster-body.

The particular form of device illustrated provides for four slice-holders and, accordingly, for a quarter turn of each slice-holder in the act of reversal. With a greater or less number of slice-holders arranged in conjunction with the toaster-body of circular or other form, an appropriate modification will naturally impose itself upon the degree of angular motion to be given to the slice-holders in making the reversal, and in the mechanism for turning the slice-holders.

The cam and crank arrangement represents merely one form of mechanism for turning the slice-holders. I have explained the principle of my invention and have set forth the best mode in which I at present contemplate embodying that principle.

I claim:—

1. A toaster comprising, a toaster-body having a surface adapted to radiate heat to a bread slice presented near it, a shaft journaled in fixed supports and lying substantially parallel with such surface, a crank upon the shaft, a skeleton slice-holder carried by said shaft and adapted to support a bread-slice with one of its sides near the surface of said toaster-body when the shaft is in one angular position and to present the opposite side of the bread-slice when the shaft is in another angular position a cam mounted for rotary motion on an axle substantially parallel with said shaft and having a cam-element engaging the pin of said crank, and a handle connected with said cam, combined substantially as set forth.

2. A toaster comprising, a base, a hollow toaster-body projecting upwardly therefrom, arms projecting outwardly and rigidly from the top of the toaster body, shafts having their lower ends journaled in said base and having their upper portions journaled in said arms, skeleton slice holders projecting laterally from said shafts and adapted to present bread-slices near the toaster-body, cranks on the upper ends of the shafts, a cam-plate mounted to rotate on a pivot centrally above the toaster-body and having cam-grooves engaging the pins of the cranks, and a handle projecting outwardly from said cam-plate, combined substantially as set forth.

3. A toaster comprising, a base, a hollow toaster-body projecting upwardly therefrom, arms projecting outwardly and rigidly from the top of the toaster body, shafts having their lower ends journaled in said base and having their upper portions journaled in said arms, skeleton slice-holders projecting laterally from said shafts and adapted to present bread-slices near the toaster-body, cranks on the upper ends of the shafts, a cam-plate mounted to rotate on a pivot centrally above the toaster-body and having cam-grooves engaging the pins of the cranks, a handle projecting outwardly from said cam-plate, and a hinge uniting the cam-plate and handle so as to permit the handle to be folded on top of the cam-plate, combined substantially as set forth.

4. A toaster comprising, a base, a hollow toaster-body projecting upwardly therefrom, arms projecting outwardly and rigidly from the top of the toaster-body, shafts having their lower ends journaled in said base and having their upper portions journaled in said arms, skeleton slice holders projecting laterally from said shaft and adapted to present bread-slices near the toaster-body, cranks on the upper ends of the shafts, a cam-plate mounted to rotate on a pivot centrally above the toaster-body and having cam-grooves engaging the pins of the cranks, a handle projecting outwardly from said cam-plate, and clawed feet projecting downwardly from said base and adapted to aggressively engage the supporting surface and aid in preventing the turning of the base when the handle is actuated, combined substantially as set forth.

FRANK E. HOFFMAN.

Witnesses:
ELMER R. SHIPLEY,
M. S. BELDEN.